United States Patent Office 3,798,334
Patented Mar. 19, 1974

3,798,334
MEAT TENDERIZATION METHOD
Roscoe T. Earl, Glenview, Ill., and Leonard M. Waldt, Springfield, N.J., assignors to Baxter Laboratories, Inc., Morton Grove, Ill.
No Drawing. Filed Dec. 21, 1971, Ser. No. 210,553
Int. Cl. A22c 18/00
U.S. Cl. 426—58                                    3 Claims

ABSTRACT OF THE DISCLOSURE

The method of tenderizing meat by injection of enzyme solution in admixture with 0.1% to 0.4% by weight of the solution of tragacanth.

---

This invention relates to a method for the tenderization of meat. More particularly, the present invention is concerned with an improvement in the method of tenderizing meat by injection of aqueous enzyme solutions.

A variety of methods have been used heretofore to promote the tenderization of meat. Many of these methods employ enzymes as the principal active tenderizing component. The introduction of an aqueous solution of proteolytic enzymes into meat has been carried out on a commercial scale under various conditions. According to one such method as described in U.S. Pat. 2,903,362, a dilute aqueous solution of proteolytic enzymes is injected into the vascular system within 24 hours prior to slaughtering the animal. In accordance with another method as disclosed in U.S. Pat. 3,276,879, a dilute aqueous solution of proteolytic enzymes is injected intramuscularly into the carcass of the slaughtered animal prior to the onset of rigor mortis.

Other enzymic tenderization methods comprise spray injection of enzyme solutions into chops and precut portions of meat such as described in U.S. Pat. 3,016,004 or impregnation with enzyme solutions prior to comminution of the meat such as disclosed in U.S. Pat. 3,506,455.

The objective of the foregoing and similar enzyme tenderization procedures is to provide a substantially uniform distribution of a selected amount of enzyme in the meat tissues and thereby improve the tenderness and texture of the meat.

Notwithstanding the general usefulness of the foregoing methods of tenderizing meat with enzyme solutions, several problems have arisen in actual practice of these methods. In some instances use of the enzyme solution tends to produce a watery or wet appearance of the meat. Frequently, the enzyme injected tissues also possess a flaccid consistency which makes it difficult to cut the meat into the desired retail portions. Another problem with present enzyme injection systems is the resulting over and under tenderization caused by a nonuniform distribution of the enzyme solution in the meat.

A number of techniques have been described heretofore for the purpose of overcoming the aforesaid problems in the enzyme tenderization of meat. One such suggested approach to overcome these problems has involved modifications to the injection pattern, needle placement and injection pressures, such as described, for example, in U.S. Pat. 3,232,209.

Another suggested solution to these problems has comprised the use of binders of one sort or another. Thus, U.S. Pats. 2,999,020, 3,006,768, 3,147,122 and 3,506,455 describe the addition of various hydrocolloids to the enzyme solution, such as gelatin, aglae, carboxymethyl cellulose, sodium carboxymethyl cellulose, and other gums and starches. However, attempts to use the various gums and starch solutions suggested by these patents have created still other problems in the injection of enzyme solutions into meat. In some instances, the solutions tend to become too viscous and cause clogging of the needles, needle openings and headers. In other cases, the enzyme solution with the added binder thickens to such an extent that it does not completely penetrate the meat muscle. Still other enzyme solutions treated with binders fail to set or gel after injection of the solution in the meat.

Accordingly, it is an object of this invention to provide an improved method of tenderizing meat by the injection of enzyme solutions.

It is another object of this invention to provide a more uniform injection of enzyme solution in the meat tissue without over or under tenderization.

It is a further object of this invention to provide an enzyme injection method which overcomes the flaccid consistency or wet appearance which has characterized enzyme injected meat heretofore.

It is still another object of this invention to provide an enzyme solution which can be uniformly injected and distributed in the meat without clogging of the needles and other injection equipment.

Other objects and advantages of the invention will be apparent to those skilled in the art upon a reading of the disclosure hereof.

In accordance with the present invention it has been found that the foregoing problems of enzyme solution injection for tenderizing meat are overcome by employing in the enzyme solution a small but effective amount of tragacanth.

Tragacanth is the dried gummy exudate of plants from the genus Astragalus and preferably the species *Astragalus gummifier*. It swells in cold water to give a viscous colloidal solution and is compatible with proteins, carbohydrates, and the proteolytic enzymes employed in the tenderization method of this invention. In dilute aqueous solution it exhibits a pH of about 5–6, which is equivalent to the natural pH of meat. A more complete description of tragacanth can be had by reference to "The United States Pharmacopeia," at p. 742, Eighteenth Revision (1970).

Surprisingly and unexpectedly, it has been found that the incorporation of from about 0.1% to about 0.4% by weight of tragacanth in a dilute aqueous solution of proteolytic enzymes provides a unique combination such that the enzyme solution is readily injected into the meat, uniformly distributed therethrough, and sets up to a firm matrix with retention of the natural moisture, meat juices and proteins. Moreover, it has been found in accordance with the present invention that less solution need be injected into the meat to obtain an amount of enzyme distrbiution in the meat tissues equivalent to that obtained by prior practice. Thus, where it has been customary heretofore to inject an amount of enzyme solution equivalent to an average of about 2½% by weight of the meat, a solution of only about 2% by weight of the meat or even lesser amounts need now be employed when tragacanth is incorporated therein in accordance with the present invention. It is seen, therefore, that the enzyme and tragacanth have a synergistic effect upon the enzyme distribution and the resulting tenderization.

Use of the tragacanth in the aforesaid proportions also provides the optimum swellability and viscosity in the meat within the desired time period of about 48 hours after injection while retaining suitable fluidity during injection such that clogging of the needles and headers is avoided.

In the case of injecting prerigor meat, it has been found that the rate of swellability of the tragacanth correlates well with the response to the meat to lowering temperature rate while in the cooler. While it is not desired to be bound by theory, it is believed that the desired swellability properties of the tragacanth are caused, in part, by its characteristics of a partially cross-linked poymer in that only a small portion is initially soluble and the greater portion retains the properties of latent swellability. The latency of swelling is extended with respect to time and the tragacanth reaches maximum viscosity after 48 hours whereby the desired distribution of the enzyme occurs during storage in the cooler.

By way of distinction, it has been found, on the one hand, that other natural gums such as gum arabic (acacia) and modified or synthetic gums such as carboxymethyl cellulose and sodium carboxymethyl cellulose do not have the desired setting properties. On the other hand, various gums such as agar, guar gum, gum karaya and locust bean gum are too viscous to be suitably injected by conventional injection equipment and, if diluted to less viscosity, do not exhibit the desired swellability or setting properties shown by tragacanth within the 48 hour period. Thus, the gums described heretofore are either too soluble in aqueous solution and lack the desired colloid forming properties, or swell initially in such a relatively short period of time to a viscosity whereby they detrimentally affect the injection pressure at the needle headers and the subsequent distribution of the enzyme in the meat tissue. Substantially higher concentrations of gums than defined herein, such as 1% and greater, do not provide the desired uniformity in the enzyme tenderization of the meat.

As a consequence of the aforesaid synergistic effect of the enzyme and tragacanth in combination, an even distribution of the solution containing the enzyme is obtained throughout the meat muscle such that no section of the meat is in any manner over tenderized or under tenderized. The meat thus injected is less flaccid and watery and contains no exomuscular pockets of enzyme solution.

In the case of prerigor carcass injection, improved retention of the natural moisture and meat juices occurs during the time when the warm meat is required to stay in the cooler-refrigerator to undergo the post-killing changes associated with chilling, rigor mortis and equilibration of muscle tone. The amount of moisture loss during this cooling is about equivalent to the amount of moisture added during the enzyme injection. After evaporation of the excess moisture during the first 48 hours in the cooler, the tragacanth attains its maximum swellability and thereafter retards loss of the natural moisture and meat juices during further storage.

Moreover, in accordance with the present invention less exudation of the natural moisture and meat juices takes place in the common retail package or on the shelf and, thereby, the appearance of the meat when sold is improved. A significant improvement also is obtained in the cutting and boning procedures of enzyme tenderized meat which, without the addition of the tragacanth in solution, is difficult to cut and debone because of muscle flaccidity and muscle weakness. Other advantages of the present invention are: a significant improvement in the palatability and taste quality of the meat when cooked and/or grilled since the natural juices contained in the meat are better retained during the heating cycle, and an increase in nutrition per pound of meat consumed since more of the natural proteins are retained in the meat during the initial chilling of the carcass and also during the cooking cycle due to the reduced losses of natural juices.

Numerous proteolytic enzymes can be employed together with the tragacanth in the aqueous enzyme injection solution according to this invention. These enzymes are generally derived from plant, animal, fungal and bacterial sources. Thus, they include but are not limited to plant enzymes such as papain, bromelain and ficin, animal enzymes such as pepsin, trypsin and chymotrypsin, fungal enzymes from *Aspergillus niger, Aspergillus oryzae* and other such fungi, and bacterial proteases such as those derived from *Bacillus subtilis, Bacillus mesentericus* and the like microbes.

The preferred enzyme for use in the present invention is papain, which is derived from the latex of the tropical plant *Carica papaya L*. The papain or other enzyme solution preferably has a proteolytic enzyme activity equivalent to from about 0.01 to about 0.05 Milk Clotting unit per gram of solution. The proteolytic activity of the papain in Milk Clotting units is determined by the milk clotting assay method as originated by Balls and Hoover, J. Biol. Chem. 121, 737–45 (1937) and modified by Hinkel and Alford, Ann. N.Y. Acad. Sci. 54, 211 (1951), and is described in further detail in U.S. Pat. 3,276,879. As used herein, M.C. refers to Milk Clotting units as defined in said patent.

The novel process of this invention is useful for tenderization of all types of meat, for example, lamb, pork, veal and beef. The enzyme solution can be introduced into the meat at a concentration of from about 1% to about 8% by weight of the meat by conventional procedures such as stitch pumping of the carcass, prior to or following rigor mortis, and injection of primal cuts and the like portions of meat. When the injection is made prior to rigor mortis, the concentration preferably is from about 1% to about 4%. Because of the unique nature of the field to which the present invention is directed, the method of injection does not generally lend itself to treatment of chopped or comminuted meats where the problem of distribution of enzyme is not of major significance.

The following examples will further illustrate the invention although it will be understood that the invention is not limited to these specific examples.

EXAMPLE 1

Apparatus for injecting enzyme tenderizing solution into beef carcasses is arranged so that a predetermined amount of solution from a tank is automatically delivered to a plurality of gangs of injection needles and thereby introduced intramuscularly into the meat tissues. The pumping equipment comprises a pressurized, thermostatically controlled, 40 gallon stainless steel mixing tank equipped with a "Lightnin" stirrer, a pipeline leading from the tank to a manifold for distribution of the solution to a series of separate headers for each gang of injection needles, and a metering device, with a manually operated control knob, for automatically delivering a controlled amount of solution to each carcass by means of pressure differentials. The needles are injection type needles having 0.187 inch O.D. and varying lengths ranging from about 4 to 7 inches. Each needle has a series of longitudinally spaced openings bored with a 70 gauge bit and radially placed about the needle. The needles are grouped in gangs of six or four needles (with 1⅝ inches of space between each needle), whereby each gang of needles can be inserted at selected anatomical areas of the carcass and at a variety of angles.

Prior to operation of the equipment, for packages of "Tona" 300 (each package containing 11.4 ounces of papain, standardized at 2.5 M.C. units per gram) and 160 grams of tragacanth are dissolved in 40 gallons of warm (100° F.) water in the mixing tank. The tank is then pressurized with air to about 50 p.s.i.g. An electrically operated solenoid valve, located along the length of the pipeline, reduces the pressure in the line to the manifold to about 20 p.s.i.g. Solenoid valves, located at each header, further reduce the pressure to the needles to about 3 p.s.i.g.

The metering device is automatically set to deliver 2% of the solution, based on the dressed weight of the carcass. The beef carcasses are weighed immediately before and after injection. Each side of the beef is injected with the solution intramuscularly in selected anatomical areas of the carcass by placement of 20 gangs of needles in each carcass by the operator, namely, nine "6-needle" injections and one "4-needle" injection in each of the hindquarter and forequarter sections of the side.

Injection of the solution in accordance with this example provides a substantially more uniform distribution of enzyme than achieved by injecting a similar enzyme solution but without the tragacanth.

Instead of injection as above, injection of a similar enzyme-tragacanth solution can be made intramuscularly into the chilled carcass following the onset of rigor mortis. Also, the metering device can be set to deliver other quantities of the enzyme solution, e.g., 1% or 4%.

It will be appreciated that the invention is not limited to the equipment described in this example, e.g., the injection can be made by a conventional meat pumping fork or by an automatic, hand operated meat injection unit such as described in copending application Ser. No. 88,439, filed Nov. 10, 1970, now U.S. Pat. 3,656,424, granted Apr. 18, 1972.

EXAMPLE 2

Several sides of beef were injected intramuscularly prior to the onset of rigor mortis as in Example 1. The carcasses were then placed in the cooler. Two days later the carcasses were cut and portioned and observed to exhibit substantially less flabbiness and wetness and were easier to cut than carcasses similarly injected with enzyme solutions but without the tragacanth. Various portions of the meat from one side of the enzyme- tragacanth-injected beef were cooked in the usual manner and found to be uniformly tender and of excellent texture and eating qualities.

EXAMPLE 3

Chuck sections of beef were injected with an aqueous tenderizing solution as in Example 1 to a level of 2½% by weight of the meat with a positive fluid displacement pumping apparatus using controlled pressure. The solution was delivered from a tank pressurized at 28 p.s.i.g. with controlled pressure at the needle headers of 10 to 12 p.s.i.g. and pressure at the needle point of 3 to 4 p.s.i.g. The tenderizing solution contained 0.2% by weight of tragacanth and 0.02 M.C. units of papain per gram of solution.

A chuck section weighing 17 pounds, 9 ounces, was injected in 4 areas with a total of 7.18 ounces of the tenderizing solution to provide an injected weight of the meat of about 18 pounds. The meat was then returned to the cooler and, when observed two days later, the meat had an internal temperature of 4° C. (39.2° F.) and the color was exceptionally good, being a very natural red color. The meat was firm, but had a natural moist appearance. The meat cut very firm and held together good, particularly in the seams. Distribution of the moisture was excellent.

The meat was then cooked and found to be exceptionally uniformly tender and testy. The meat's texture was exceptionally good and the connecting tissue broke down very well during the chewing.

By way of comparison with the foregoing example, in the case of two other chuck sections similarly treated with the enzyme solution but containing 0.2% guar gum and 0.4% guar gum, respectively, instead of the tragacanth, injections were difficult due to viscosity of the solutions, undesirable excess moisture was observed, especially at the seams, the meat cut with difficulty, and excess moisture was released during cooking.

In still other tests, it was found that injection of enzyme solutions of the same concentrations in meat as in the prior example, but with 10% gum arabic, or 1% agar, or 1% sodium salt of carboxymethyl cellulose, respectively, instead of the 0.4% tragacanth, did not provide the excellent uniform distribution of the enzyme tenderization but, instead, exhibited undesirable flaccid and wet characteristics. In particular, the agar caused clogging of the needles while the gum arabic and carboxymethyl cellulose gave unsatisfactory binding of the moisture.

The tragacanth used in the foregoing examples was a commercially available product marketed by Stein, Hall & Co., Inc., New York, N.Y., under the trade designation "T-300." This is a food-grade gum tragacanth which meets the specifications of the Food Chemicals Codex and the United States Pharmacopeia. A 1% aqueous solution of this material after 48 hours incubation at 25° C. exhibits a viscosity of 550–650 cps. using a LVF Brookfield Viscometer with the number 3 spindle at 60 r.p.m. About 60% to 70% of the viscosity is obtained within the first one-half hour of incubation and about 90% within the first 24 hours. It will be understood that the invention is not limited to this specific product and that other commercially available, food-grade gum tragacanth materials can also be used in accordance with the invention. The product which is to be used preferably is sterilized to ensure freedom from deleterious microorganisms such as Salmonella and E. coli.

Other examples of the present invention will be apparent to those skilled in the art after reading this disclosure without departing from the spirit and scope of the invention. All such further examples are included within the scope of the invention as defined in the appended claims.

What is claimed is:

1. An improved method of tenderizing meat by injection of aqueous enzyme solution comprising intramuscularly injecting the prerigor meat carcass to a level of from about 1% to about 4% of the dressed weight of the meat with an aqueous solution containing from about 0.1% to about 0.4% by weight of the solution of tragacanth and an amount of enzyme product sufficient to provide a proteolytic enzyme activity of from about 0.01 to about 0.05 M.C. unit per gram of said solution whereby a synergistic effect upon the enzyme distribution and meat tenderization is obtained.

2. The method of claim 1 in which the enzyme is papain.

3. An improved method of tenderizing meat by injection of aqueous enzyme solution comprising injecting the meat subsequent to the onset of rigor mortis to a level of from about 1% to about 8% of the dressed weight of the meat with an aqueous solution containing from about 0.1% to about 0.4% by weight of the solution of tragacanth and an amount of enzyme product sufficient to provide a proteolytic enzyme activity of from about 0.01 to about 0.05 M.C. unit per gram of said solution whereby a synergistic effect upon the enzyme distribution and meat tenderization is obtained.

References Cited

UNITED STATES PATENTS

| | | | |
|---|---|---|---|
| 2,805,163 | 9/1957 | Williams et al. | 99—107 |
| 3,019,171 | 1/1962 | Bloch et al. | 99—107 X |
| 3,276,879 | 10/1966 | Silberstein | 99—107 |
| 3,147,122 | 9/1964 | Williams | 99—107 |

HYMAN LORD, Primary Examiner